United States Patent [19]

Meijer et al.

[11] Patent Number: 5,744,804
[45] Date of Patent: Apr. 28, 1998

[54] SYSTEM FOR DETERMINING A COMPOSITON OF RADIONUCLIDES

[75] Inventors: Robert Johan Meijer, Roden; Cornelis Stapel, Groningen, both of Netherlands

[73] Assignee: Rijksuniversiteit Te Groningen, Netherlands

[21] Appl. No.: 722,264

[22] PCT Filed: Apr. 4, 1995

[86] PCT No.: PCT/NL95/00125
§ 371 Date: Dec. 2, 1996
§ 102(e) Date: Dec. 2, 1996

[87] PCT Pub. No.: WO95/27223
PCT Pub. Date: Oct. 12, 1995

[30] Foreign Application Priority Data

Apr. 5, 1994 [NL] Netherlands ............ 9400534

[51] Int. Cl.$^6$ ............................................. G01T 1/16
[52] U.S. Cl. ..................... 250/369; 250/256; 250/262
[58] Field of Search ............................ 250/256, 262, 250/369, 370.01; 378/45, 83

[56] References Cited

U.S. PATENT DOCUMENTS 4,717,825  1/1988  Smith, Jr. et al. ............ 250/256

*Primary Examiner*—Don Wong
*Attorney, Agent, or Firm*—Welsh & Katz, Ltd.

[57] ABSTRACT

The system relates to a system for determining a composition of radionuclides in, for instance, a mineral-containing material by detecting gamma and/or X-ray radiation emitted by the nuclides. To that end, the system comprises a detector unit (2,6, 10) which supplies an electrical signal containing information about the intensity and energy of the emitted radiation and a signal processing system by which these electrical signals are further processed for determining the composition mentioned. According to the invention, the signal processing system further comprises an A/D converter (14) to which the electrical signals are applied and a first computer unit (26) which further processes signals supplied by the A/D converter for the purpose of determining the composition mentioned.

29 Claims, 2 Drawing Sheets

SYSTEM FOR DETERMINING A COMPOSITON OF RADIONUCLIDES

The invention relates to a system for determining a composition of radionuclides in, for instance, a mineral-containing material by detecting gamma and/or X-ray radiation emitted by the nuclides, comprising a detector unit which supplies an electrical signal containing information about the intensity and energy of the emitted radiation and a signal processing system by which these electrical signals are further processed for determining the composition referred to.

Such systems are known per se and are employed inter alia for the exploration and exploitation of oil and gas. This method is based on the presence of radionuclides in minerals. These nuclides emit radiation which is characteristic of the nuclide in question. By detecting this radiation, information can be obtained about the composition of nuclides in minerals.

The nuclides of interest to be detected are nuclides having a long life (half-time in excess of $10^9$ years), such as e.g. $^{40}K$, $^{232}Th$, $^{235}U$ and $^{238}U$ and their decay products. During the period in which minerals were formed, these nuclides were incorporated into them. The concentration of these nuclides in the minerals is highly dependent on the type of mineral. Accordingly, these concentrations are often characteristic of the mineral type and site.

The radionuclides mentioned typically decay by way of a long sequence of intermediate products to a stable lead isotope. During this decay, inter alia alpha, beta, gamma and x-ray radiation are released. The present invention, however, only relates to the detection and interpretation of emitted gamma and x-ray radiation.

Although the gamma radiation is not emitted by the nuclides $^{232}Th$, $^{235}U$ and $^{238}U$ but by nuclides further down the decay sequence, for convenience the terms Th and U activity are used in this specification.

In the known systems, the radiation to be detected is for instance allowed to fall on a crystal, whereby a light flash can be generated. In case of gamma and x-ray radiation, such a photon causes such a light flash. These light flashes are applied to a photomultiplier which converts the light flashes into electrical pulses. The magnitude of the electrical pulse is a measure for the energy of the photon incident on the crystal.

By counting the number of pulses for a period of, for instance, twenty seconds, and sorting them according to pulse magnitude, an energy spectrum can be composed, i.e. the number of photons recorded per unit time as a function of their energy.

Such a spectrum will contain peaks or lines which are respectively caused at least substantially by the radionuclides mentioned. A peak or a set of peaks can then be ascribed to a nuclide. In addition, however, contributions from other physical phenomena are present in the spectrum, such as for instance the Compton effect.

In the known systems the spectrum is analyzed per window. Within a window a peak a present. That is to say that the content of generally three windows is determined. On the basis of the content of these windows, it can be determined which nuclides have been detected. The information about the content of the windows is then processed in combination in order to determine the concentrations of the nuclides in the material in question, since the concentrations of the nuclides appear to comprise a practically linear relation with the intensity of the radiation, i.e. with the number of photons emitted.

These systems often utilize NaI(Tl) crystals; such a crystal has a moderate energy resolution and further is fairly insensitive to highly energetic radiation, so that a long integration time, for instance more than 20 seconds, is required to obtain a useful spectrum.

The object of the invention is to overcome the above-mentioned disadvantage of low sensitivity, on the one hand by preferably using a crystal of higher sensitivity and, on the other, by involving as good as the total energy spectrum in the analysis. The object of the invention is moreover to provide a system which, if so desired, also enables correction for other influences, such as for instance temperature fluctuations, etc.

To that end, in accordance with the invention, the signal processing system comprises an A/D converter to which the electrical signals mentioned are applied and a first computer unit which further processes signals supplied by the A/D converter for the purpose of determining the composition mentioned. Because the spectrum is composed by the computer to be subsequently analyzed by the computer, the effects mentioned can easily be corrected for.

According to a preferred embodiment, the detector unit comprises a scintillation detector and a photomultiplier which converts the light pulses supplied by the scintillation detector into an electrical pulse of an amplitude which is a measure for the energy of the radiation received by the scintillation detector. The detector preferably comprises a pulse height analyzer for obtaining the electrical signals mentioned from the electrical pulses.

However, according to the invention it is also possible to use other detector units. Such an alternative detector unit can comprise a semiconductor crystal to which a bias voltage is applied and means for detecting a variation in the bias voltage for obtaining the electrical signals.

According to a particular aspect of the invention, the first computer unit composes an energy spectrum of the detected radiation from the signals supplied by the A/D converter. In particular, the first computer unit determines the concentration of the radionuclides on the basis of the spectrum by a predetermined first algorithm.

According to a highly advantageous embodiment, the first computer unit determines the concentrations on the basis of the complete determined spectrum. Because according to this method all available information, i.e. the complete spectrum, is utilized, a very high accuracy is obtained. According to the known method discussed earlier, in which the content of mostly only three windows is analyzed, only about 10 percent of the available information is processed.

In accordance with the invention, the detector unit is preferably provided with a BGO crystal. The sensitivity of such a crystal to highly energetic radiation is much better (by an order of magnitude) than the sensitivity of a conventional NaI(Tl) crystal. The energy resolution, however, is slightly less good than in the case of the NaI(Tl) crystal, so that the energy spectrum will comprise somewhat broader peaks. The peaks will therefore overlap to a larger extent. By virtue of the fact that the spectrum is analyzed with the predetermined algorithm mentioned, reliable information can yet be obtained from the spectrum.

According to another aspect of the invention, the first computer unit determines the composition of the material in minerals on the basis of the concentrations by a predetermined second algorithm.

According to yet another aspect of the invention, the first computer unit comprises a memory in which energy spectra of radiation emitted by radionuclides are stored. These spectra stored in the memory can be used in the predetermined first algorithm. Similarly, the memory of the computer may store data of minerals which are known as such and the corresponding concentrations of radionuclides. Such information stored in the memory can be used in the second algorithm.

According to a highly advanced embodiment of the invention, the detector unit comprises sensors by which sound, temperature, magnetism and/or other physical phenomena in the environment of the nuclides to be detected can be detected and converted into an electrical sensor signal. The sensor signal can be applied via the A/D converter to a computer unit, such as, for instance, the first computer unit for performing corrections in determining the composition referred to.

It is moreover possible for the sensor signal to be applied to a second computer unit for the purpose of correcting and/or stabilizing the detector unit.

Thus the detector unit and the first computer unit can be separated from each other, allowing the corrections mentioned to be performed directly, locally at the detector unit.

Thus, it is for instance possible that the system further comprises a transmitter unit to which output signals of the A/D converter are applied and a receiver unit which applies received signals to the first computer unit, while the detector unit and the A/D converter are accommodated, for instance, in a probe-forming housing. Such a probe can be deployed in many places.

In this connection it is noted that the system according to the invention finds application in many areas. The system can for instance be used for measuring and/or analyzing sludge, separating minerals in, for instance, waste processing, and tracing waste streams in rivers and oceans. In addition, the detector unit of the system can also be mounted under a plane for performing radiometric tracings. Yet another example is the performance of horizontal and/or vertical soil research, the performance of soil analyses and the above-mentioned exploration and exploitation of minerals.

The invention will be further explained below with reference to the drawing. In the drawing.

Figure 1:
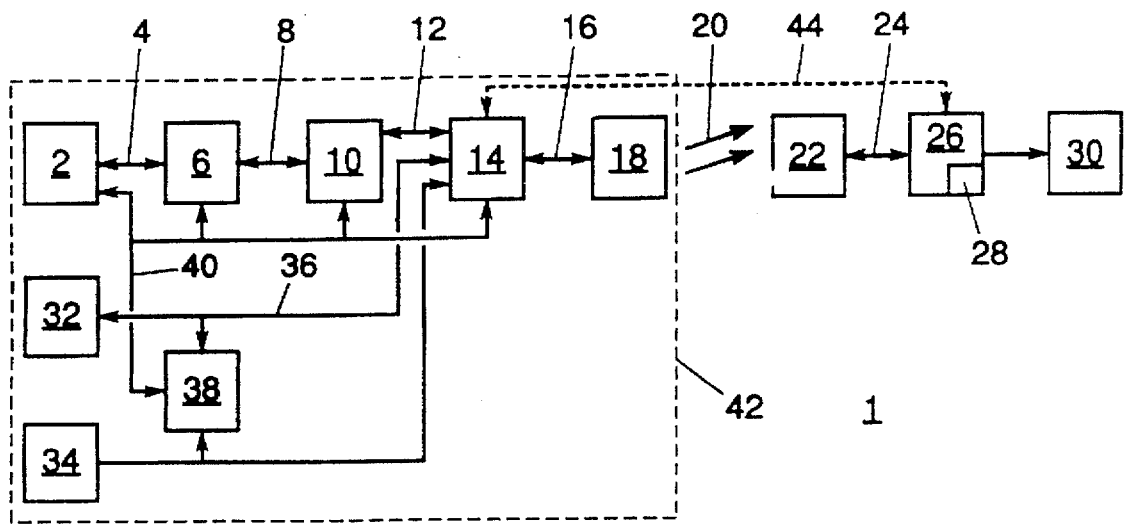
FIG. 1 shows an embodiment of a system according to the invention.

In FIG. 1 reference numeral 1 designates a system according to the invention for detecting and interpreting gamma and x-ray radiation emitted by radionuclides. The system comprises a scintillation detector 2, known per se: in this example a BGO (Bismuth Germanium Oxide) crystal. This crystal can generate a light flash when a photon of the radiation falls on the crystal. These light flashes are applied to a known type of photomultiplier 6, as diagrammatically designated by reference numeral 4. The photomultiplier 6 converts the light pulses supplied by the scintillation detector into an electrical pulse of an amplitude which is a measure for the energy of the radiation received by the scintillation detector. These electrical pulses are applied via line 8 to a known type of pulse height analyzer 10.

The pulse height analyzer generates on line 12 electrical signals containing information about the height of a pulse and hence the energy emitted by the photons. This analyzer 10 consists, for instance, of a detection device, not shown here, which produces a signal if a pulse is present and a "sample and hold" device, also not shown, to which the output signal of the last-mentioned detection device is applied. The number of photons detected per unit time (cps) is a measure for the intensity of the radiation, so that this information is also present in the electrical signal on line 12.

The electrical signal referred to is subsequently applied to an A/D converter 14 which digitizes the signal.

In this example, the digitized signal is then applied via line 16 to a transmitter/receiver unit 18, which radiates the digitized signal. The carrier modulated with the electrical signal is diagrammatically indicated by reference numeral 20.

The system in this example further comprises a transmitter/receiver unit 22 for receiving and demodulating the signal transmitted by the transmitter/receiver unit 18. The transmitter/receiver unit 22 provides on line 24 a digital signal which corresponds with the digital signal supplied by the A/D converter.

The digital signal is then applied to a first computer unit 26 for further processing. In a manner which is known per se, the computer unit 26 composes from the digital information an energy spectrum as is shown, by way of example, in FIG. 2.

Figure 2:
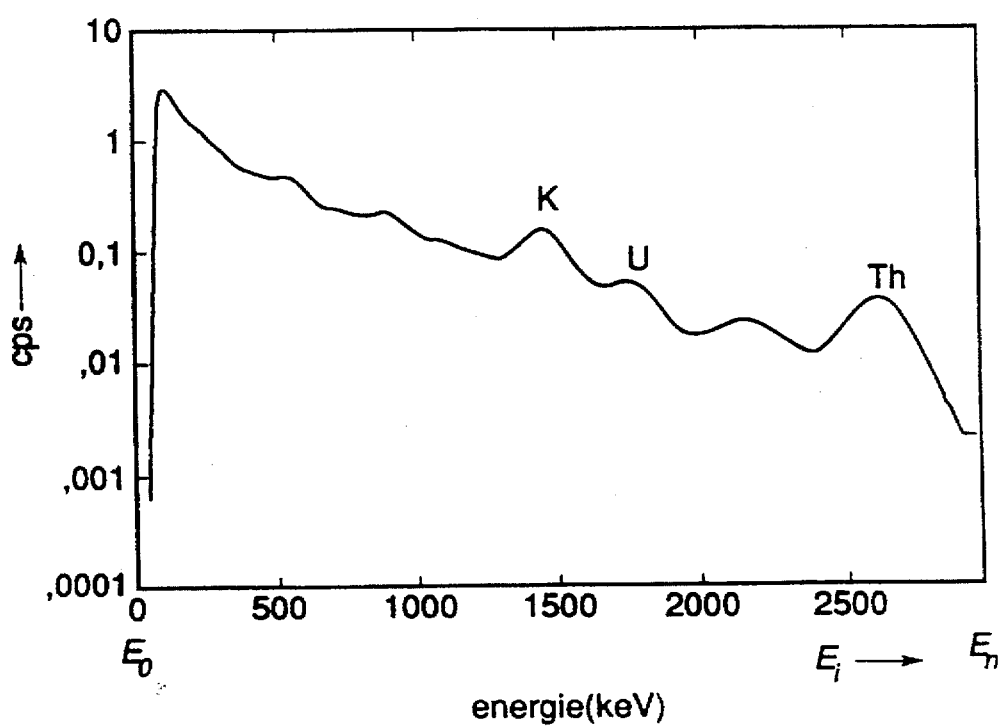
FIG. 2 shows an example of an energy spectrum of a mineral.

In this example the first computer unit 26 counts for a period of about one second the number of pulses having a magnitude between $E_{i+1}$ and $E_i$ for i=1,1, . . . n with $n=(E_n-E_0)/(E_{i+1}-E_i)$. If n is large, an at least substantially continuous spectrum can be constructed, as is shown in FIG. 2. In FIG. 2 three peaks are visible which stem from K, U and Th.

On the basis of spectra coming from, respectively, pure K, U, and Th and which are stored in a memory 28 of the first computer unit 26, the spectrum of FIG. 1 is de-convolved according to a first algorithm for obtaining the concentrations of the detected isotopes in question, for instance in a material comprising various minerals. For this purpose the algorithm preferably utilizes the entire spectrum, i.e. all information that is available.

Also stored in the memory 28 are data about known minerals and the concentrations of the isotopes contained therein. The computer 26 then determines, on the basis of these data and the measured concentrations, according to a second algorithm, in what ratio the groups of minerals have been detected. These data are then relayed to a data output system 30 for further processing. According to this method, therefore, a new spectrum can be determined and analyzed per second or so much longer as is desired.

On the basis of spectra determined by the first computer unit 26 it is then possible to adjust particular parameters in respect of which for instance the photomultiplier 6, the pulse height analyzer and the A/D converter have been set. This creates a feedback to the photomultiplier 6, the pulse height analyzer and/or the A/D converter 14. The feedback signals generated by the computer unit 26 can be fed to the A/D converter via line 24, transmitter/receiver units 22, 18 and line 16. The system further comprises a D/A converter to feed these feedback signals via lines 12 and 8 to the photomultiplier 6 and the pulse height analyzer 10. If, for instance, the amplification factor of the signal is not optimal, for instance the gain of one of these components 6,10 and/or 14 can be adjusted in this way.

According to a particular embodiment of the system, the system further comprises additional sensors. In this example, two of such sensors 32,34 are shown. It is also possible, however, to expand the system with three or more sensors. The sensor 32 in this example is a temperature sensor. The temperature-representing signals supplied by this sensor 32 are fed to the A/D converter via line 36. The A/D converter digitizes this signal and dispatches it via line 16 to the transmitter/receiver unit. In this connection, it can be ensured, for instance through multiplex techniques or coding techniques, that these signals on line 16 are distinguishable from signals coming from the pulse height analyzer 10. The first computer unit 26 can then utilize the received digitized temperature-representing signals for carrying out the first and/or second algorithm, if these algorithms contain temperature-dependent parameters. Similarly, the system comprises a motion detector 34 whose signals are applied to the first computer unit 26 for further processing, via the same route as described for the temperature sensor. In general, it holds that the information obtained with the additional sensors can be used for carrying out corrections through software. However, it is also possible for the first computer unit to generate feedback signals on the basis of information obtained with the additional sensors, which feedback signals, as described hereinbefore, can be applied to various components of the system for adjusting, for instance, the parameters referred to.

According to a highly advanced embodiment of the invention, the system 1 further comprises a second computer unit 38 to which also output signals from the sensors 32, 34 are applied. The second computer unit 38 processes these signals according to a third algorithm which determines in what way setting parameters of, for instance, the photomultiplier 6, pulse height analyzer 10 and/or A/D converter 14 can be adjusted via line 40. Thus, for instance, the gain of the units 6, 10, 14 can be adjusted depending on the temperature.

According to a highly advantageous embodiment, the units 2, 6, 10, 14 and 18 are assembled in a housing 42 and constitute a probe. If the units 32, 34 and 38 are present, they can also be accommodated in the housing 42. The provides the advantage that the probe can be set directly and be adjusted on the basis of physical conditions of the direct environment of the probe as measured by the sensors 32, 34.

The invention is not limited to the embodiments of the system 1 shown in FIG. 1. Thus, on the one hand, the transmitter/receiver units 18, 22 can be replaced by a direct connection by means of line 44. On the other hand, the other lines of FIG. 1 can be replaced by pairs of transmitter/receiver units. The A/D converter 14 could form part of the second computer unit 38. The system can also form part of a larger system, such as for instance a mineral separation system. In such a separation system, a basic stream of material is typically split up into a first stream which comprises minerals of a first type and a first residual group. The first residual group can then be split up into a second stream which comprises minerals of a second type and a second residual group, etc. By means of the system 1 it can for instance be determined how many minerals of the first type are present in the basic stream. On the basis of this information, process parameters (such as for instance the speed of the basic stream) of the separation system can be set. In addition, with the system 1 it can be determined in respect of the first residual group how many minerals of the second type are present in it. On the basis of this information, process parameters of the separation system can also be set, etc. Also, it can be checked if, for instance, the stream with minerals of the first type is not "contaminated" with other minerals.

The software of the first and second computer units preferably comprises a protection against unauthorized copying.

Figure 3:
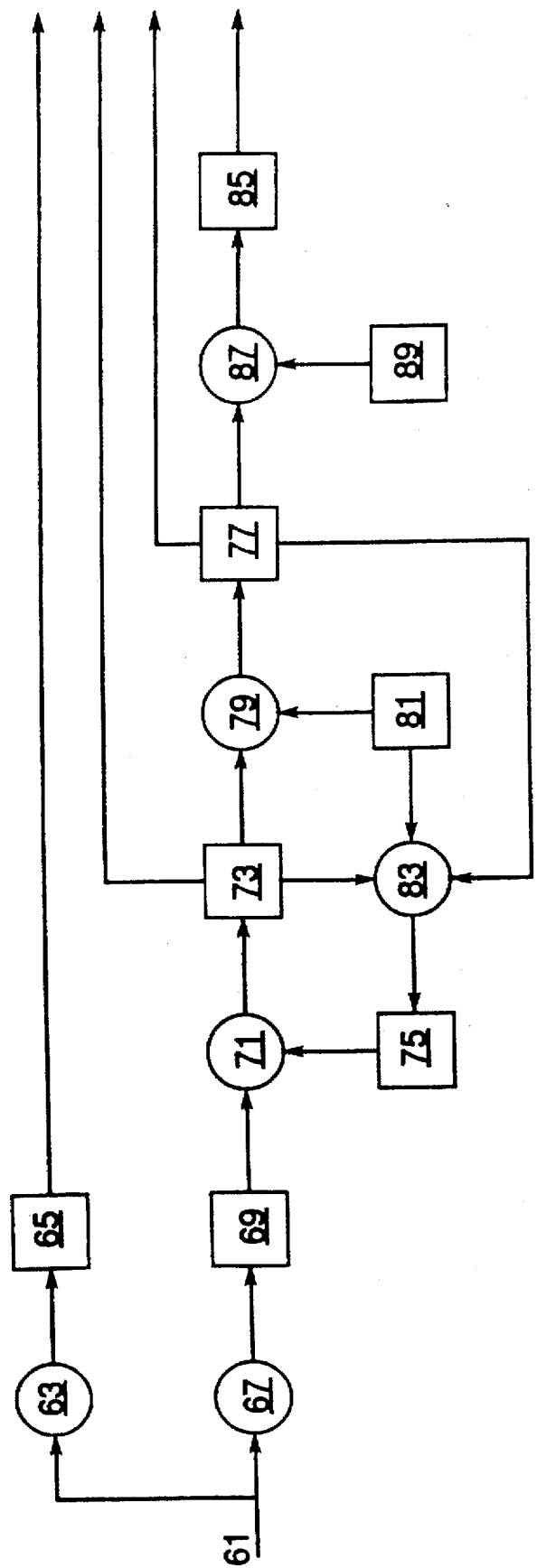
FIG. 3 shows the process steps which are carried out by the system according to FIG. 1.

In illustration, it will now be indicated with reference to FIG. 3 which process steps the first and second algorithms can be made up of.

In FIG. 3 an operation is represented by a circle and data by a square.

From the input data 61, the data of the other sensors are continuously selected and processed 63. The processed data 65 can be outputted. From the input data 61, the data of the detector are also continuously selected and sorted 67 and collected in a spectrum 69. Once per second or so much longer as is desired, this spectrum is converted 71 to another spectrum 73, in which the measured photons have been sorted according to energy. This takes place with a number of conversion factors 75. From this spectrum 73 concentrations 77 of potassium, uranium and thorium are calculated 79 using previously recorded spectra of K, U and Th separately and a background spectrum 81. Energy stabilization 83 is obtained by composing a spectrum from concentrations 77 and spectra 81 and comparing this with spectrum 73 and adjusting conversion factors 75 on the basis thereof. This stabilization takes place entirely through software. From the K, U and Th concentrations 77, mineral or mineral group proportions 85 are calculated 87 using previously determined radiometric data of these minerals 89.

The calculation 79 of the concentrations 77 can be performed as follows.
Hereinafter the following applies:

S(i) number of photons detected per second with energy $E_i$ in material to be analyzed;

$C_x$=concentration of nuclide x in material to be analyzed;

X(i)=K(i), U(i), Th(i): number of photons detected per second with energy $E_i$ coming from pure K, U or Th spectra;

B(i)=number of photons detected per second with energy $E_i$ coming from background radiation;

i=1, 2 ... n; and x=K, U or Th.

The values of K(i), U(i), Th(i) and B(i) are predetermined. The value of $C_K$, $C_U$ and $C_{Th}$ can be determined according to the least-squares method.

This means that:

$$\sum_i \frac{[C_K \cdot K(i) + C_U \cdot U(i) + C_{Th} \cdot Th(i) + B(i) - S(i)]^2}{\sigma_{S(i)}^2} = \text{minimum} \quad (1)$$

wherein $\sigma_{S(i)} = \sqrt{S(i)}/T$ represents the uncertainty in the number of detected photons with energy $E_i$ in the time interval T.

From formula (1), $C_K$, $C_U$ and $C_{Th}$ can be determined. It is noted that formula (1) can also be applied by using only a part of the spectrum. Accordingly, in that case not all values of i are used. Then preferably those values of i are used for which it holds that $E_i$ lies in or adjacent a peak.

The calculation of 87 can be performed as follows. The assumption is that the material to be analyzed comprises four groups of minerals which are designated a, b, c and d. Every mineral group is characterized by its relative mass $m_j$ in the material and three concentrations $C_j(U)$, $C_j(Th)$ and $C_j(K)$ with j=a, b, c or d.

The relative masses are characteristic of the material to be analyzed, while the concentrations ($C_j(U)$, $C_j(Th)$ and $C_j(K)$) are characteristic of the mineral group. These last-mentioned concentrations are therefore known. A mineral group is a predefined group of minerals whose spectra are very much alike. However, a mineral group may also consist of only one kind of mineral. The mineral groups are further defined in such a manner that the spectra of different mineral groups are not very much alike.

For the material, it holds that C(U), C(Th) and C(K) represent the total (activity) concentrations of U, Th and K. These values can have been determined according to formula (1). It further holds that:

$$m_aC_a(U)+m_bC_b(U)+m_cC_c(U)+m_dC_d(U)=C(U) \qquad (2)$$

$$m_aC_a(Th)+m_bC_b(Th)+m_cC_c(Th)+m_dC_d(Th)=C(Th)$$

$$m_aC_a(K)+m_bC_b(K)+m_cC_c(K)+m_dC_d(K)=C(K)$$

$$m_a+m_b+m_c+m_d=1$$

From the equation (2), using the known values of $C_j(U)$, $C_j(Th)$ and $C_j(K)$ and the measured values of $C(U)$, $C(Th)$ and $C(K)$, the values of $m_a$, $m_b$, $m_c$ and $m_d$ can be determined.

Comparisons (2) can be written in matrix form as $$C_p m = C$$

wherein $$C_p = \begin{pmatrix} C_a(Bi) & C_b(Bi) & C_c(Bi) & C_d(Bi) \\ C_a(Th) & C_b(Th) & C_c(Th) & C_d(Th) \\ C_a(K) & C_b(K) & C_c(K) & C_d(K) \\ 1 & 1 & 1 & 1 \end{pmatrix},$$

$$m = \begin{pmatrix} m_a \\ m_b \\ m_c \\ m_d \end{pmatrix} \text{ and } C = \begin{pmatrix} C(Bi) \\ C(Th) \\ C(K) \\ 1 \end{pmatrix}.$$

The uncertainties in $m_i$, $\sigma(m_i)$ follow from $$\sigma^2(m)=(C_p^{-1})^2 \, (\sigma^2(C_p)m^2+\sigma^2(C)).$$

In this comparison $C_p^{-1}$ is the inverse of $C_p$ and by the squaring of matrices is meant the squaring of each element of the matrix. The matrices $\sigma(m)$, $\sigma(C_p)$ and $\sigma(C)$ consists of the uncertainties in the elements of $m$, $C_p$ and $C$, with zeros on the bottom row of $\sigma(C_p)$ and $\sigma(C)$.

On the basis of the values of $m_a$, $m_b$, $m_c$ and $m_d$ it is now known in what amounts the mineral groups a, b, c and d are present in the analyzed material.

We claim:

1. A system for determining a composition of a mineral-containing material by detecting gamma and/or x-ray radiation emitted by radionuclides in the material, comprising a detector unit which supplies an electrical signal containing information about the intensity and energy of the emitted radiation and a signal processing system by which these electrical signals are further processed for determining said composition of radionuclides, wherein the signal processing system comprises an A/D converter to which said electrical signals are applied and a first computer unit which further processes signals supplied by the A/D converter for the purpose of determining said composition of radionuclides; the first computer unit composes an energy spectrum of the detected radiation from the signals supplied by the A/D converter; and wherein the first computer unit determines the concentrations C(U), C(Th) and C(K) of the radionuclides uranium, thorium and potassium respectively according to the first algorithm and the relative masses $m_j$ ($j$=a, b, c or d) of respective mineral groups which are designated a, b, c and d according to the second algorithm said second algorithm $m_j$ ($j$=a, b, c or d) is determined from the equation:

$$C_p m = C$$

wherein $$C_p = \begin{pmatrix} C_a(Bi) & C_b(Bi) & C_c(Bi) & C_d(Bi) \\ C_a(Th) & C_b(Th) & C_c(Th) & C_d(Th) \\ C_a(K) & C_b(K) & C_c(K) & C_d(K) \\ 1 & 1 & 1 & 1 \end{pmatrix},$$

$$m = \begin{pmatrix} m_a \\ m_b \\ m_c \\ m_d \end{pmatrix} \text{ and } C = \begin{pmatrix} C(Bi) \\ C(Th) \\ C(K) \\ 1 \end{pmatrix},$$

and wherein every mineral group a, b, c or d is characterized by its three known concentrations $C_j(U)$, $C_j(Th)$ and $C_j(K)$ with $j$=a, b, c or d.

2. A system according to claim 1, characterized in that the detector unit comprises a scintillation detector and a photomultiplier which converts the light pulses supplied by the scintillation detector into an electrical pulse of an amplitude which is a measure for the energy of the radiation received by the scintillation detector.

3. A system according to claim 2, characterized in that the detector unit further comprises a pulse height analyzer for obtaining said electrical signals.

4. A system according to claim 2, characterized in that the scintillation detector comprises a BGO crystal.

5. A system according to claim 1, characterized in that the detector unit comprises a semiconductor crystal to which a bias voltage is applied and means for detecting a variation in the bias voltage for obtaining said electrical signals.

6. A system according to claim 1, characterized in that the first computer unit determines said concentrations on the basis of the complete determined spectrum.

7. A system according to claim 1, characterized in that the first computer unit determines said concentrations on the basis of predetermined energy ranges of the spectrum which correspond to spectra of individual radionuclides whose concentration is being determined.

8. A system according to claim 1, characterized in that the first computer unit comprises a memory in which energy spectra of radiation emitted by radionuclides are stored.

9. A system according to claim 8, characterized in that the spectra stored in the memory are used in the predetermined first algorithm.

10. A system according to claim 8, characterized in that data of minerals which are known per se and the corresponding concentrations of radionuclides in said minerals are stored in the memory of the first computer unit.

11. A system according to claim 10, characterized in that the second algorithm utilizes the information about said minerals which is stored in the memory.

12. A system according to claim 1, characterized in that the detector unit comprises sensors by which sound, temperature, magnetism and/or other physical phenomena in the environment of the radionuclides to be detected can be detected and converted into an electrical sensor signal.

13. A system according to claim 12, characterized in that the sensor signal is applied via the A/D converter to the first computer unit for the purpose of performing corrections in determining said compositions.

14. A system according to claim 13, characterized in that said corrections are performed through software.

15. A system according to claim 12, characterized in that the sensor signal is applied to a second computer unit for correcting and/or stabilizing the detector unit.

16. A system according to claim 15, characterized in that the second computer unit is also accommodated in said housing.

17. A system according to claim 1, characterized in that the system further comprises a transmitter unit to which output signals of the A/D converter are applied and a receiver unit which feeds received signals to the first computer unit.

18. A system according to claim 1, characterized in that the output signals of the A/D converter are fed to the first computer unit via a cable.

19. A system according to claim 1, characterized in that the detector unit and the A/D converter are accommodated in a probe-forming housing.

20. A system for determining a composition of mineral-containing material by detecting gamma and/or x-ray radiation emitted by radionuclides in the material, comprising a detector unit which supplies an electrical signal containing information about the intensity and energy of the emitted radiation and a signal processing system by which these electrical signals are further processed for determining said composition of radionuclides, wherein the signal processing system comprises an A/D converter to which said electrical signals are applied and a first computer unit with a memory for storing energy spectrum of radiation emitted by radionuclides and which further processes signals supplied by the A/D converter for the purpose of determining said composition of radionuclides; the first computer unit composes an energy spectrum of the detected radiation from the signals supplied by the A/D converter; and wherein the first computer unit determines the concentration of the radionuclides on the basis of the spectrum according to a prescribed first algorithm, wherein the first computer unit determines, according to a second algorithm, what amounts of predetermined groups of minerals are present in the material on the basis of the determined concentrations of the radionuclides in the material wherein each predetermined group of minerals comprises a group of minerals whose spectra are similar.

21. A system according to claim 20, wherein the first computer unit determines the concentrations C(U), C(Th) and C(K) of he radionuclides uranium, thorium and potassium, respectively, according to the first algorithm and that the first computer unit determines the relative masses $m_j$ ($j$=a, b, c or d) of respective mineral groups which are designated a, b, c and d according to the second algorithm.

22. A system according to claim 21, wherein, according to the second algorithm, $m_j$ ($j$=a, b, c or d) is determined from the equation:

$$C_p m = C$$

wherein $$C_p = \begin{pmatrix} C_a(Bi) & C_b(Bi) & C_c(Bi) & C_d(Bi) \\ C_a(Th) & C_b(Th) & C_c(Th) & C_d(Th) \\ C_a(K) & C_b(K) & C_c(K) & C_d(K) \\ 1 & 1 & 1 & 1 \end{pmatrix},$$

$$m = \begin{pmatrix} m_a \\ m_b \\ m_c \\ m_d \end{pmatrix} \text{ and } C = \begin{pmatrix} C(Bi) \\ C(Th) \\ C(K) \\ 1 \end{pmatrix},$$

and wherein every mineral group a, b, c or d is characterized by its three known concentrations $C_j(U)$, $C_j(Th)$ and $C_j(K)$ with $j$=a, b, c or d.

23. A system according to claim 20, wherein the detector unit comprises a scintillation detector and a photomultiplier which converts the light pulses supplied by the scintillation detector into an electrical pulse of an amplitude which is a measure for the energy of the radiation received by the scintillation detector.

24. A system according to claim 23, wherein the detector unit further comprises a pulse height analyzer for obtaining said electrical signals.

25. A system according to claim 20, wherein the detector unit comprises a semiconductor crystal to which a bias voltage is applied and means for detecting a variation in the bias voltage for obtaining said electrical signals.

26. A system according to claim 20, wherein the first computer unit determines said concentrations on the basis of the complete determined spectrum.

27. A system according to claim 20, wherein the first computer unit determines said concentrations on the basis of predetermined energy ranges of the spectrum which correspond to spectra of individual radionuclides whose concentration is being determined.

28. A system according to claim 27, wherein data of known minerals and the concentrations of radionuclides in said minerals are stored in the memory of the first computer unit.

29. A system according to claim 20, wherein the spectra stored in the memory are used in the predetermined first algorithm.

* * * * *